US006522438B1

(12) United States Patent
Mizuhara

(10) Patent No.: US 6,522,438 B1
(45) Date of Patent: Feb. 18, 2003

(54) HIGH-SPEED OPTICAL DUOBINARY MODULATION SCHEME

(75) Inventor: Osamu Mizuhara, Allentown, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/411,118

(22) Filed: Oct. 4, 1999

(51) Int. Cl.[7] ............................................... H04B 10/04
(52) U.S. Cl. ....................... 359/181; 359/183; 359/187
(58) Field of Search ................................ 359/181, 183, 359/187

(56) References Cited

U.S. PATENT DOCUMENTS

| 5,543,952 | A | | 8/1996 | Yonenaga et al. |
| 5,917,642 | A | | 6/1999 | O'Donnell et al. |
| 6,097,525 | A | * | 8/2000 | Ono et al. ................... 359/181 |
| 6,188,497 | B1 | * | 2/2001 | Franck et al. ............... 359/181 |
| 6,421,155 | B1 | * | 7/2002 | Yano ........................... 359/156 |

OTHER PUBLICATIONS

Yoneyama, Mikio et al., Differential Precoder IC Modules for 20 and 40–Gbit/s Optical Duobinary Transmission Systems, IEEE Transactions on Microwave Theory and Techniques, vol. 47, No. 12, Dec. 1999.*
Aisawa, Shigeki et al., A 1580–nm Band WDM Transmission Technology Employing Optical Duobinary Coding, IEEE Journal o Lightwave Technology, vol. 17, No. 2, Feb. 1999.*
Yonenaga, K. et al., High–speed transmission system based on optical modified duobinary signals, IEEE Electronic Letters, Apr. 29, 1999, vol. 35, No. 9.*
Yonenaga, K. et al., 160 Gbit/s WDM transmission experiment using four 40 Gbit/s optical duobinary channels, IEEE Electroni Letters, Jul. 23, 1998, vol. 34, No. 15.*

* cited by examiner

Primary Examiner—Jason Chan
Assistant Examiner—David Payne
(74) Attorney, Agent, or Firm—Steve Mendelsohn; Yuri Gruzdkov

(57) ABSTRACT

A duobinary modulator and a method of modulating an optical signal so as to be coded in a duobinary manner, using optical modulating specifically adapted for this purpose is provided. Two input electrical signals are respectively input to two binary encoders. The binary encoders encode the input electrical signals and generate a pair of encoded binary signals which are then input to an analog amplifier. The analog amplifier amplifies the encoded binary signals and generates a pair of duobinary signals. Then, the duobinary signals are input to a dual-electrode modulator which modulates a pair of optical beams with the duobinary signals to generate a pair of modulated optical duobinary signals. Both modulated optical duobinary signals are then combined to generate the desired high-speed modulated optical duobinary signal.

17 Claims, 4 Drawing Sheets

HIGH-SPEED OPTICAL DUOBINARY MODULATION SCHEME

BACKGROUND OF THE INVENTION

1. Field of the Invention

The present invention generally relates to optical communications, and in particular, to optical duobinary modulation schemes.

2. Description of Related Art

The ever-increasing demand for telecommunication systems has led to the development of high-bandwidth optical transmission systems having multi-gigabit data rates. As the bandwidth of a telecommunication system increases, previously unimportant system factors become critical to the successful operation of the system.

One factor which has become critical is the chromatic dispersion of an optical data signal, where the broadening of the digital pulses as the signal is propagated through the transmission system degrades the system performance and causes increased bit-error rates. Since the chromatic dispersion is essentially a function of the propagation velocity in a fiber and the wavelength of that light, signals with a broader optical spectrum will be more severely corrupted by inter-symbol interference effects than signals with a narrower spectral content. The broadening of the optical spectral content of a given signal is usually referred to as the "chirp" of the signal.

The use of dc-biased narrow-linewidth laser sources in conjunction with zero-chirp external modulators has resulted in the information bandwidth itself being the limiting and controlling factor of the spectral content of a signal, and hence the severity of the inter-symbol interference at a receiver. If all other parameters remain constant for such a system, a reduction in transmission bandwidth should result in a reduction of the chromatic dispersion penalty for the system.

The use of so-called duobinary codes is one way of reducing the information bandwidth, since a duobinary coded signal (i.e., duobinary modulated signal) has half the-transmission bandwidth of a binary signal. A duobinary modulated signal is in fact a ternary signal having three levels: −1, 0, 1.

As shown in FIG. 1, in a traditional optical duobinary modulation scheme, first an electrical signal 101a is input to an exclusive-or gate 103. Exclusive-or gate 103 receives input electrical signal 101a as well as a feedback electrical signal 101b. Feedback electrical signal 101b is created by taking an output signal 105 (i.e., output from binary encoder 103), adding a delay to this signal via a delay-block 107, and then providing this signal back to exclusive-or gate 103 as feedback electrical signal 101b. Usually the added delay equals one time slot. Exclusive-or gate 103 and delay block 107 together are known as binary encoder 108.

Exclusive-or gate 103 receives input electrical signal 101a and feedback electrical signal 101b, and creates an encoded binary signal 109. This encoded binary signal 109 is then input to a low-pass filter 111. Low-pass filter 111 receives encoded binary signal 109 and generates a duobinary signal 113. Duobinary signal 113 typically comprises three levels, e.g., 0, 1, 2 or −1, 0, 1. The levels of duobinary signal 113 are induced by choosing appropriate bandwidth of low-pass filter 111.

Duobinary signal 113 is then input to an optical modulator 115. Optical modulator 115 receives duobinary signal 113 as well as an optical input 117. Optical input 117 is an optical beam generated by a traditional light source 121, e.g., a laser diode. Optical modulator 115 modulates optical beam 117 with duobinary signal 113 and creates a modulated optical duobinary signal 119. Modulated optical duobinary signal 119 has the same line-rate as the input electrical signal 101a but has optical properties.

FIG. 2 illustrates a timing chart corresponding to the traditional scheme of FIG. 1. The timing chart has been provided to illustrate processing of signals in the traditional scheme. In FIG. 2, graph 201 depicts timing of input electrical signal 101a, and graph 203 depicts timing of feedback electrical signal 101b. As illustrated, electrical signals 101a and 101b have the same line-rate.

Graph 205 depicts timing of encoded binary signal 109, wherein encoded binary signal 109 has been created by inputting electrical signals 101a and 101b to exclusive-or gate 103. Graph 207 depicts timing of duobinary signal 113 wherein duobinary signal 113 has been created by passing encoded binary signal 109 through low-pass filter 111. In graph 207, duobinary signal 113 is shown to have three levels: 0, 1, −1.

Graph 209 depicts timing of output optically modulated duobinary signal 119 wherein optically modulated duobinary signal 119 has been created by modulating optical beam 117 with duobinary signal 113.

The modulation scheme described in FIGS. 1 and 2 has many advantages including high fiber dispersion tolerance. However, this scheme requires a binary encoder 108 operating at the line-rate of input electrical signal 101a. As the line-rate increases, for example, 40 Gb/s or higher, it becomes increasingly difficult to implement binary encoder 108 operating at such a high line-rate. For example, there are no commercial binary encoders available in the market that function at a line-rate of 40 Gb/s or higher.

SUMMARY OF THE INVENTION

A method and apparatus for generating high-speed modulated optical duobinary signals are provided.

In accordance with the principles of the present invention, two input electrical signals are respectively input to two binary encoders. The binary encoders encode the input electrical signals and generate a pair of encoded binary signals which are then input to an analog amplifier. The analog amplifier amplifies the encoded binary signals and generates a pair of duobinary signals. Then, the duobinary signals are input to a dual-electrode modulator which modulates a pair of optical beams with the duobinary signals to generate a pair of modulated optical duobinary signals. Both modulated optical duobinary signals are then combined to generate the desired high-speed modulated optical duobinary signal.

The principles of the present invention provide a low-cost solution because two low-speed electrical signals may be used as input electrical signals to generate a high-speed modulated duobinary signal having twice the line-rate of the input signals, e.g., if the desired line-rate of the output duobinary signal is 40 Gb/s, the input electrical signals may have a line rate of 20 Gb/s.

Similarly, the principles of the present invention permit the use of low-cost binary encoders. For example, if the desired line-rate of the output duobinary signal is 40 Gb/s, each of the binary encoders of the present invention may operate at only 20 Gb/s (half of the line-rate of the desired high-speed optical duobinary signal). This is a substantial improvement over the prior art, which required binary encoders to operate at the same line-rate as the desired output line-rate.

In one embodiment, the present invention is a method for generating an optical duobinary signal, comprising the steps of (a) converting a first electrical signal into a first encoded binary signal; (b) converting a second electrical signal into a second encoded binary signal; (c) inputting the first and second encoded binary signals to an analog amplifier to create a first duobinary signal and a second duobinary signal; and (d) applying the first duobinary signal and a first optical beam to an first optical modulator, and applying the second duobinary signal and second optical beam to a second optical modulator to generate an output optical duobinary signal.

In another embodiment, the present invention is an optical duobinary signal generator, comprising (a) a first binary encoder configured to generate a first encoded binary signal from a first electrical input signal; (b) a second binary encoder configured to generate a second encoded binary signal from a second electrical input signal; (c) an analog amplifier coupled to the first and second binary encoders and configured to generate first and second duobinary signals from the first and second encoded binary signals; and (d) a pair of optical modulators coupled to the analog amplifier and configured to modulate a pair of optical beams with the first and second duobinary signals to generate an output optical duobinary signal.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
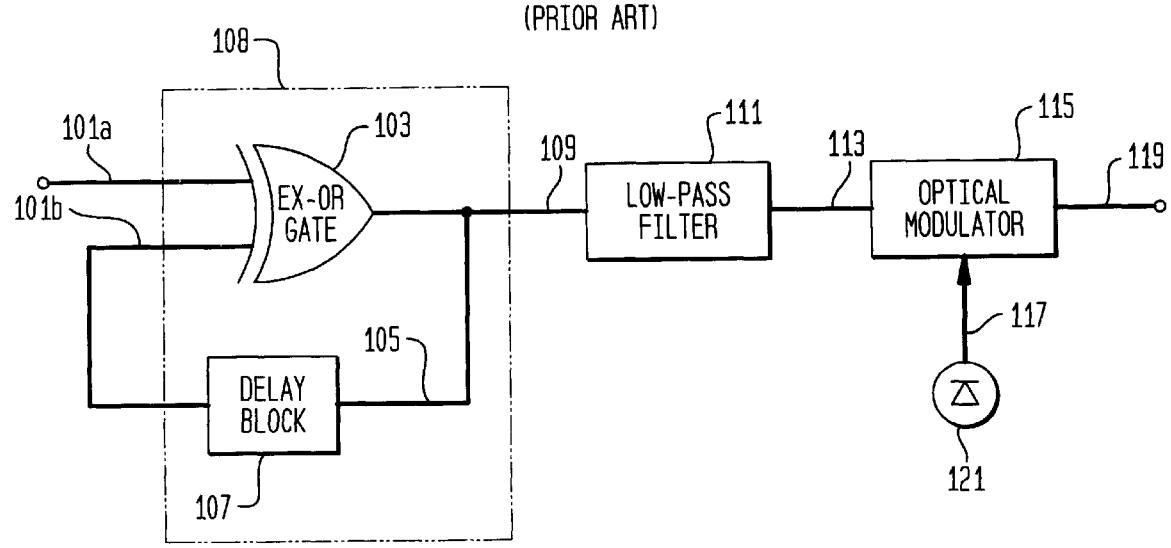
FIG. 1 shows a traditional optical duobinary modulation scheme.
Figure 2:
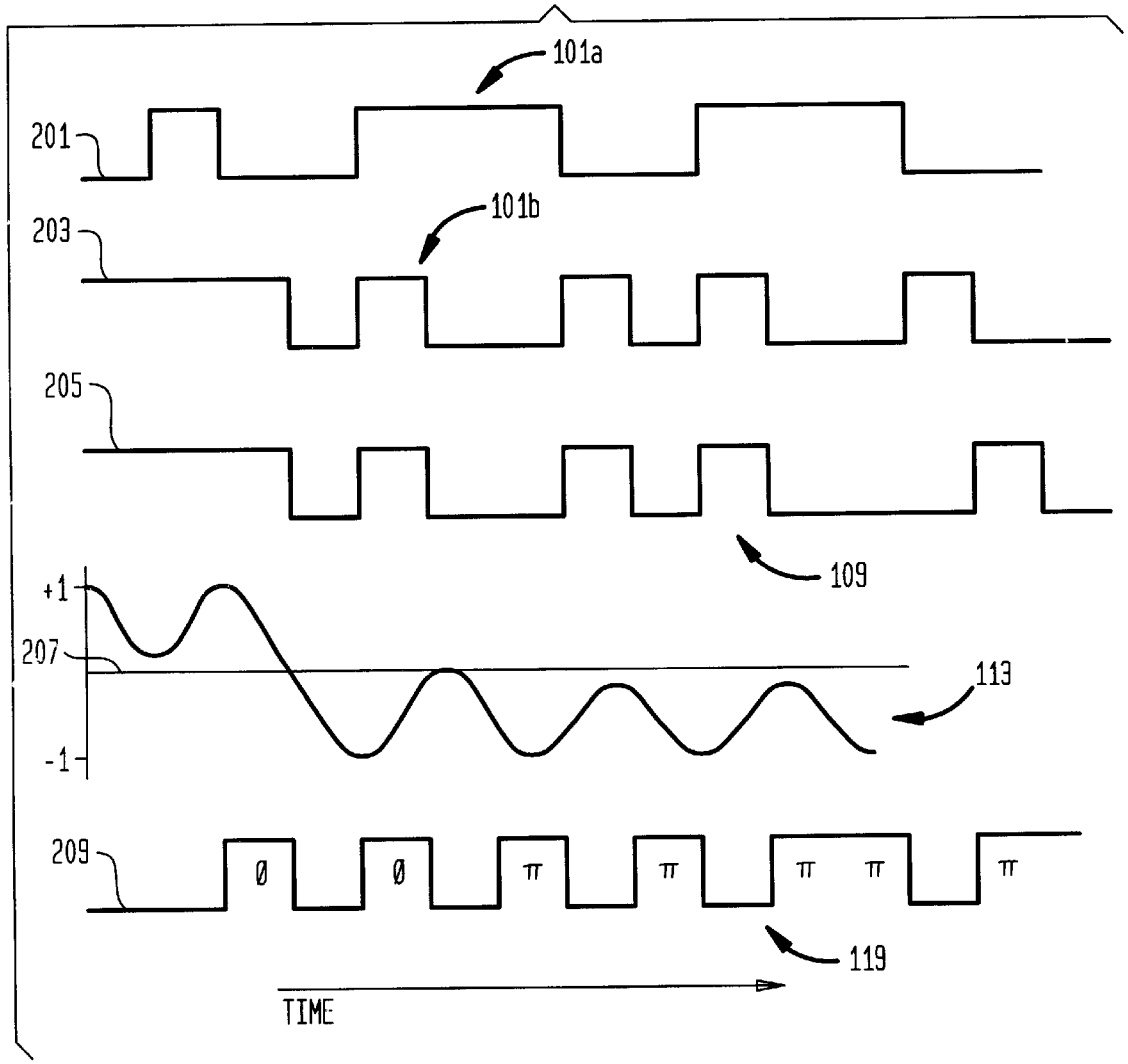
FIG. 2 illustrates a timing chart for the traditional scheme of FIG. 1.
Figure 3:
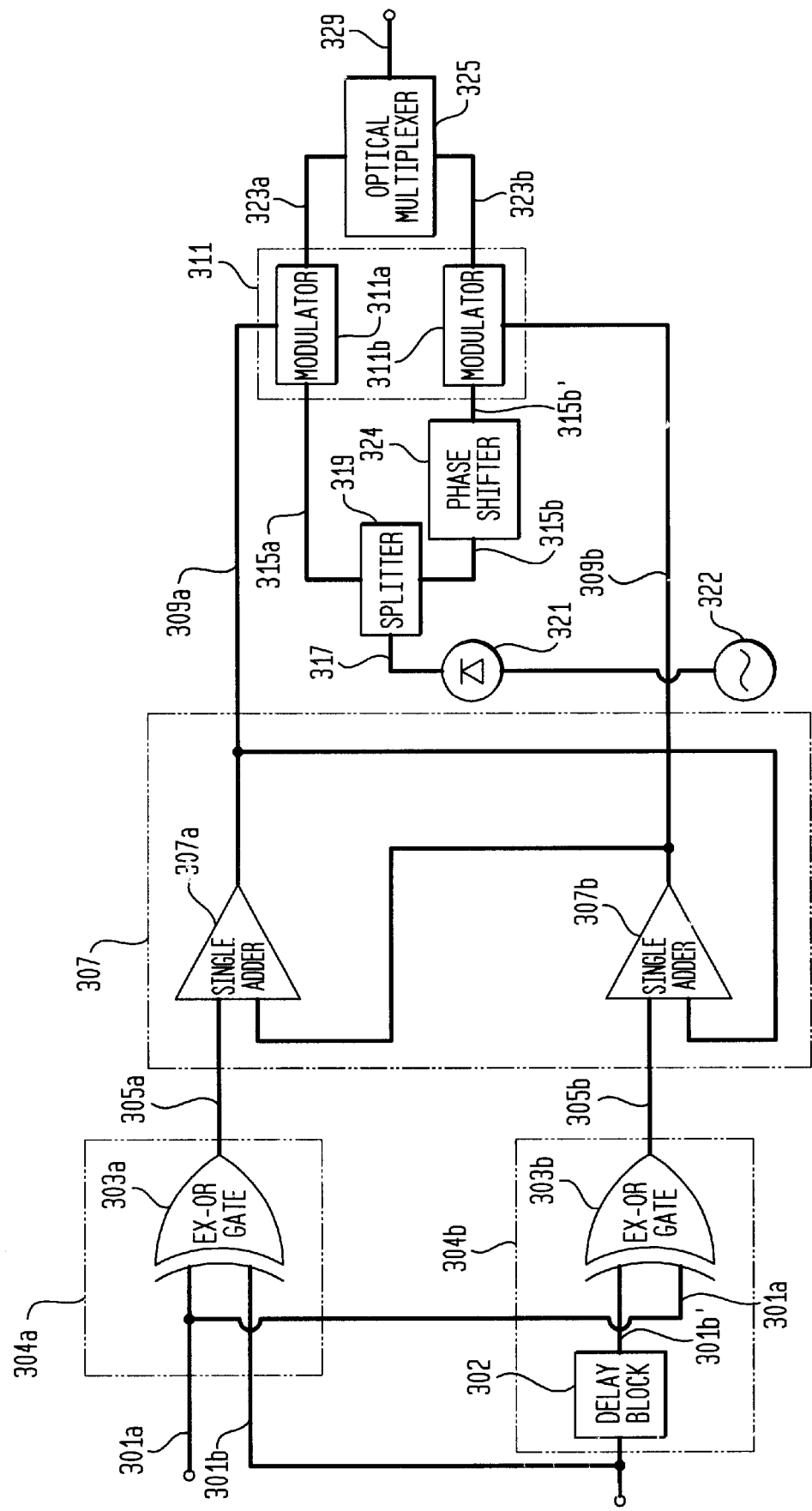
FIG. 3 depicts a high-speed optical modulation scheme in accordance with one embodiment of the present invention.

FIG. 3 depicts a high-speed optical modulation scheme in accordance with one embodiment of the present invention.

In FIG. 3, two input electrical signals 301a and 301b are respectively input to a first and a second exclusive-or gate 303a and 303b. Exclusive-or gate 303a is configured to receive input electrical signal 301a as well as input electrical signal 301b. Exclusive-or gate 303b is configured to receive input electrical signal 301a as well as a delayed-input electrical signal 301b'. Delayed-input electrical signal 301b' is created by adding delay to input electrical signal 301b via a delay-block 302, wherein delay equals one time slot of the input electrical signal. Exclusive-or gate 303a is configured to receive two input electrical signals and is also known as binary encoder 304a. Exclusive-or gate 303b and delay-block 302 together are known as binary encoder 304b.

Exclusive-or gate 303a receives input electrical signals 301a and 301b and generates an encoded binary signal 305a. Similarly, exclusive-or gate 303b receives input electrical signals 301a and 301b', and generates another encoded binary signal 305b.

Encoded binary signals 305a and 305b are then input to an analog amplifier 307. Analog amplifier 307 comprises two single-adders 307a and 307b having criss-cross feedbacks, wherein output from single-adder 307a is fed back to the other single-adder 307b as an input and vice-versa. Generally, analog amplifier 307 is a limiting amplifier and limits the outputs of single-adders 307a and 307b to +1 or −1. Any additional outputs are sliced.

Analog amplifier 307 receives binary encoded signals 305a and 305b, and in turn generates two duobinary signals 309a and 309b. Duobinary signals 309a and 309b are then respectively input to modulators 311a and 311b. Duobinary signal 309a is input to modulator 311a and duobinary signal 309b is input to modulator 311b.

Modulators 311a and 311b are also configured to respectively receive two optical beams 315a and 315b'. Optical beams 315a and 315b' are usually identical in nature having same wavelength. As shown in FIG. 3, first, two optical beams 315a and 315b are created by passing an optical input beam 317 from an optical source 321, through a splitter 319 where optical input beam 317 is split into two identical portions, i.e., optical beam 315a and 315b. Optical source 321 is generally modulated with a clock signal from a clock-source 322, wherein clock signal has a line-rate equal to the line-rate of input electrical signals 301a and 301b. Optical beam 315b is then passed through a phase-shifter 324 to generate a phase-shifted optical beam 315b' having a phase offset relative to the clock signal. Generally optical beam 315b' has a phase-shift of 180 degrees relative to the clock signal.

Modulator 311a receives optical beam 315a, and modulates this optical beam with duobinary signal 309a to generate a modulated optical duobinary signal 323a. Similarly, modulator 311b receives optical beam 315b' and modulates this optical beam with duobinary signal 309b to generate another modulated optical duobinary signal 323b.

Modulated optical duobinary signals 323a and 323b are then combined via an optical multiplexer 325 to generate desired high-speed modulated optical duobinary signal 329. High-speed modulated optical duobinary signal 329 has optical duobinary properties and twice the line-rate of input electrical signals 301a and 301b. Furthermore, modulated optical duobinary signal 329 has an optical phase that is constant between adjacent pulses.

The optical modulation scheme as described in FIG. 3 is a low-cost solution as it permits generation of high-speed optically modulated signals without requiring high-speed binary encoders. For example, if the desired line-rate of output modulated optical duobinary signal 329 is 40 Gb/s, then each input signal 301a and 301b may have a line-rate of 20 Gb/s and each binary encoder need operate at a line-rate of only 20 Gb/s. In the prior art, to generate a 40 Gb/s optical duobinary signal, a binary encoder operating at 40 Gb/s was required.

The principles of the present invention are flexible and may be used to generate output optical duobinary signals having a line-rate greater than 40 Gb/s.

Figure 4:
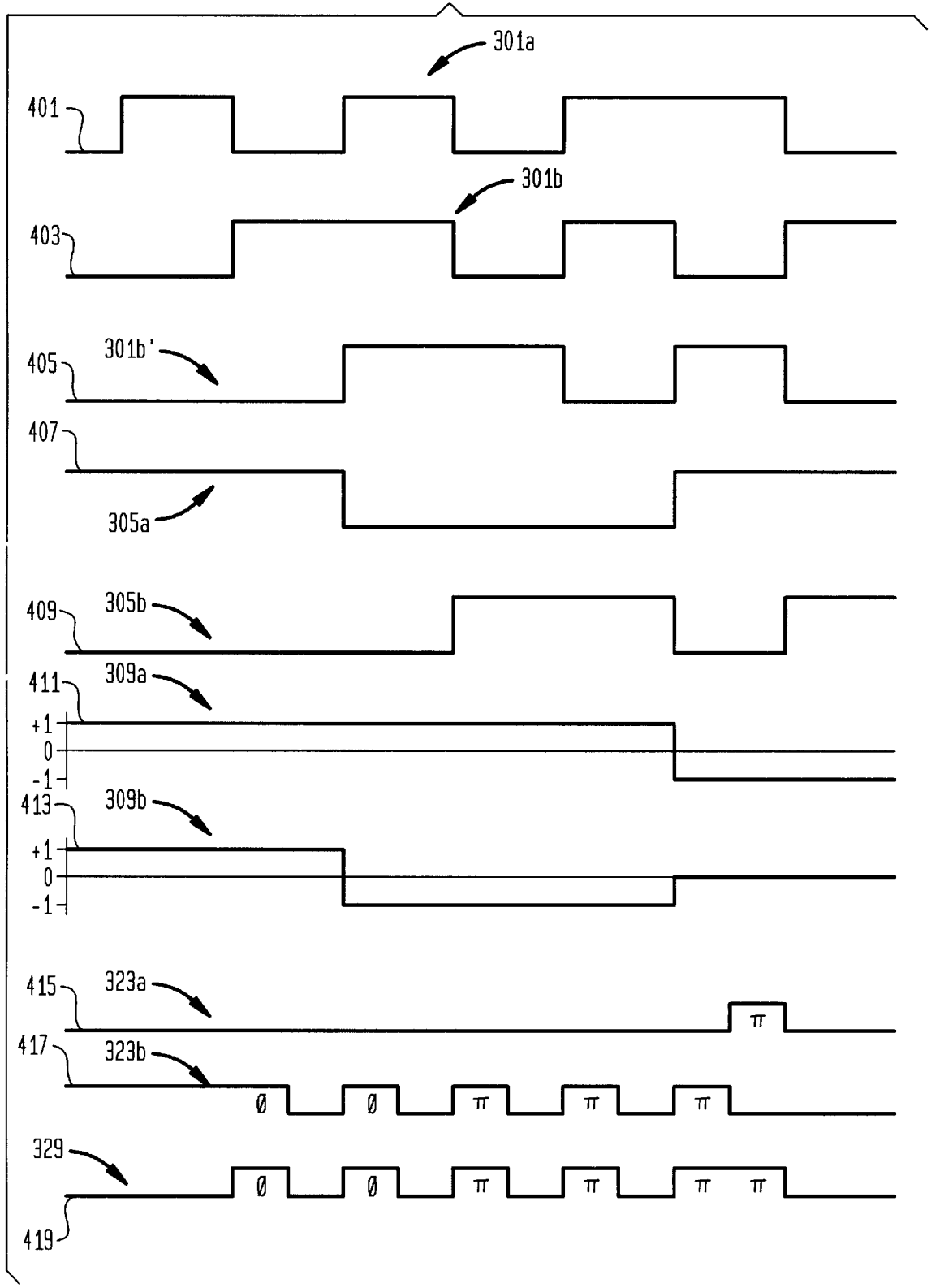
FIG. 4 illustrates a timing chart corresponding to the optical modulation scheme of FIG. 3.

FIG. 4 illustrates a timing chart corresponding to the optical modulation scheme of FIG. 3. This timing chart has been provided to illustrate processing of signals in the optical modulation scheme in accordance with the principles of the present invention. In FIG. 3, graph 401 depicts a timing chart for input signal 301a and graph 403 depicts a timing chart for input signal 301b. As illustrated, input signals 301a and 301b have identical line-rates, but carry independent information.

Graph 405 depicts a timing chart for delayed input signal 301b'. As illustrated, input signal 301b' is a delayed form of input signal 301b.

In FIG. 4, graph 407 and graph 409 respectively illustrate encoded binary signals 305a and 305b, wherein encoded binary signal 305a has been generated by encoding input signals 301a and 301b, and encoded binary signal 305b has been generated by encoding input signal 301a and 301b'.

Graph 411 and graph 413 respectively illustrate duobinary signals 309a and 309b wherein duobinary signals 309a and 309b have been generated by respectively amplifying encoded binary signals 305a and 305b via analog amplifier 307.

Graph 415 and graph 417 respectively illustrate modulated optical duobinary signals 323a and 323b wherein optically modulated duobinary signals 323a and 323b have been created by respectively modulating optical beams 315a and 315b' with duobinary electrical signals 309a and 309b. Finally, graph 419 illustrates high-speed optically modulated duobinary signal 329, wherein high-speed optically modulated duobinary signal 329 has been created by multiplexing optically modulated duobinary signals 323a and 323b.

The present invention as described in FIG. 3 and FIG. 4 provides both a duobinary modulator and a method of modulating an optical signal so as to be coded in a duobinary manner, using optical modulating techniques specifically adapted for this purpose. The present invention provides a low-cost solution, e.g., encoders of the present invention perform the same encodings as the traditional scheme, but operate at half of the prior-art speed requirements. Thus, in accordance with the principles of the present invention, high-speed modulated optical duobinary signals may be generated with a reduced dollar cost.

The principles of the present invention are flexible. For example, the apparatus in accordance with the principles of the present invention may be implemented on an integrated circuit or a circuit board. In a preferred embodiment, of the invention is implemented based on a standard Mach-Zehnder modulator, in which an input optical beam is split by a structure such as a Y-junction into two essentially parallel optical beams. These parallel optical beams are subsequently recombined by another Y-junction or similar structure, such that the output optical intensity is determined by the relative phases of the optical intensities in the two parallel optical beams. The modulator may have dual complementary outputs, in which case, the recombining Y-junction may be replaced by an X-junction (i.e., a cross-over structure) or a directional coupler. In this embodiment, the M-Z modulator corresponds to modulator 311a or 311b of the present invention.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for generating an optical duobinary signal, comprising the steps of:
   (a) converting a first electrical signal into a first encoded binary signal;
   (b) converting a second electrical signal into a second encoded binary signal;
   (c) inputting the first and second encoded binary signals to an analog amplifier to create a first duobinary signal and a second duobinary signal; and
   (d) applying the first duobinary signal and a first optical beam to a first optical modulator, and applying the second duobinary signal and a second optical beam to a second optical modulator to generate an output optical duobinary signal, wherein one of the first and second optical beams is a phase-shifted copy of the other optical beam.

2. The invention of claim 1, wherein the output optical duobinary signal has a line-rate approximately twice as large as the line-rate of the first and second electrical signals.

3. The invention of claim 2, wherein each of the first and the second electrical signals has a line-rate of about 20 Gb/s and the output optical duobinary signal has a line-rate of about 40 Gb/s.

4. The invention of claim 1, wherein the first and second optical modulators are Mach-Zehnder interferometers.

5. The invention of claims 1, wherein first and second optical beams are generated by a single optical source modulated with a clock signal generated by a clock source.

6. The invention of claim 5, wherein one of the first and second optical beams has a 180 degree phase-shift relative to the clock signal.

7. The invention of claim 1, wherein step (d) comprises the steps of:
   (1) applying the first duobinary signal and the first optical beam to the first optical modulator to generate a first optical duobinary signal;
   (2) applying the second duobinary signal and the second optical beam to the second optical modulator to generate a first optical duobinary signal; and
   (3) combining the first and second duobinary signals to generate the output optical duobinary signal.

8. An optical duobinary signal generator, comprising:
   (a) a first binary encoder configured to generate a first encoded binary signal from a first electrical input signal;
   (b) a second binary encoder configured to generate a second encoded binary signal from a second electrical input signal;
   (c) an analog amplifier coupled to the first and second binary encoders and configured to generate first and second duobinary signals from the first and second encoded binary signals;
   (d) a first optical modulator coupled to the analog amplifier and configured to modulate a first optical beam with the first duobinary signal; and
   (e) a second optical modulator coupled to the analog amplifier and configured to modulate a second optical beam with the second duobinary signal, wherein one of the first and second optical beams is a phase-shifted copy of the other optical beam and an output optical duobinary signal is generated by combining the first and second modulated optical beams.

9. The invention of claim 8, wherein the output optical duobinary signal has a line-rate approximately twice as large as the line-rate of the first and second electrical signals.

10. The invention of claim 9, wherein each of the first and the second electrical signals has a line-rate of about 20 Gb/s and the output optical duobinary signal has a line-rate of about 40 Gb/s.

11. The invention of claim 8, wherein the optical modulators are Mach-Zehnder interferometers.

12. The invention of claim 8, further comprising a multiplexer configured to combine the first and second modulated optical beams to generate the output optical duobinary signal.

13. The invention of claim 8, further comprising an optical source modulated with a clock signal generated by a clock source.

14. The invention of claim 13, wherein one of the first and second optical beams has a phase-shift of 180 degrees relative to the clock signal.

15. The invention of claim 8, wherein the analog amplifier comprises two adders configured with criss-cross feedback.

16. The invention of claim 15, wherein the analog amplifier is a limiting analog amplifier configured to limit the output of the adders to +1 or −1.

17. The invention of claim 8, wherein the first and second binary encoders operate at approximately half the line-rate of the output optical duobinary signal.

* * * * *